United States Patent [19]

Hannerz

[11] Patent Number: 4,859,406
[45] Date of Patent: Aug. 22, 1989

[54] REACTOR

[75] Inventor: Kåre Hannerz, Våsterås, Sweden

[73] Assignee: AB Asea-Atom, Våsterås, Sweden

[21] Appl. No.: 128,103

[22] Filed: Dec. 3, 1987

[30] Foreign Application Priority Data

Dec. 17, 1986 [SE] Sweden .................................. 8605418

[51] Int. Cl.⁴ .............................................. G21C 1/32
[52] U.S. Cl. ...................................... 376/406; 376/328
[58] Field of Search ................ 376/328, 402, 406, 391

[56] References Cited

U.S. PATENT DOCUMENTS

| 2,946,732 | 7/1960 | Wootton | 376/391 |
|---|---|---|---|
| 3,262,857 | 7/1966 | Schlicht et al. | 376/402 |
| 4,526,742 | 7/1985 | Hannerz | 376/328 |
| 4,664,871 | 5/1987 | Schoening | 376/391 |
| 4,689,194 | 8/1987 | Wachholz et al. | 376/391 |
| 4,713,213 | 12/1987 | Schoening et al. | 376/391 |
| 4,725,400 | 2/1988 | Elter et al. | 376/391 |

Primary Examiner—Deborah L. Kyle
Assistant Examiner—Richard W. Wendtland
Attorney, Agent, or Firm—Watson, Cole, Grindle & Watson

[57] ABSTRACT

To be able to design a smaller unit of a nuclear power plant, the containment of pre-stressed concrete has been made in the form of a bottle. In this way, a "conventional" pump with a shaft packing and a dry motor can be used by locating the motor, for driving the pump for circulation of the process water, in a sealed, detachably connected steel dome (16). When being removed, the detachably connected steel dome (16) provides access to the riser (1) for refuelling.

6 Claims, 8 Drawing Sheets

REACTOR

TECHNICAL FIELD

The present invention relates to a reactor with a reactor core enclosed in a water-filled core vessel, the vessel being connected to an inlet and an outlet for cooling water. Between the outlet and a heat exchanger there is arranged a hydraulic connection and between the inlet and the heat exchanger there is arranged a hydraulic connection. A re-circulation pump is arranged for transporting the cooling water through the reactor core. The core vessel with the reactor core is enclosed in a space which is filled and pressurized with a neutron absorbing aqueous solution.

PRIOR ART

As is well-known, the SECURE reactor is available in two versions, namely, SECURE-H for district heating and SECURE-P for the production of electric power. Internationally, SECURE-P is most often known under the designation "PIUS", which is effect is an acronym for a principle: Process Inherent Ultimate Safety.

A number of different configurations for these reactors have been studied during the years 1982-1986. Some of these have been patented. Others, which have been studied recently, may possibly be patented. In the following a description will be given of the fundamental features of these alternatives, without making any judgment as to what may be patentable. Common for all embodiments is that the reactor core is located in the lower part of a large pressure vessel of pre-stressed concrete. This vessel is filled with water containing boric acid with a boron content of about 0.25%. The water is cooled by heat exchangers placed in the pool, so that the temperature is normally maintained at about 50° C. Under the core there is an opening, designated density lock, between the circulating water system which cools the core and the above-mentioned pool. In this opening, which consists of a number of parallel vertical tubes, hot cooling water is stably stratified over colder pool water. Above the core, the hot water coming from the core flows upwards through a riser. At a certain distance above the core (which varies between the variants described below), the riser is in communication with the pool via an additional opening, designated upper density lock, which operates, in principle, in the same way as the lower one. With the aid of a control system, the flow through the core is maintained at such a level that no flow through the density locks takes place during normal operation. In the case of disturbances which are of interest from the point of view of safety, this control cannot be maintained. A flow through the density locks takes place, boric acid containing water reaches the core and the core is shut off.

This is the fundamental principle of the SECURE reactors and has been patented. A variety of different configurations of reactor systems can then be based on this fundamental principle.

A plant with a total power of ~600 MWe may contain three so-called steam generating modules instead of a larger core, which supplies several steam generators plus pumps. The modules are located inside a concrete vessel, each having a reactor core, a steam generator, and a circulation pump. The concrete vessel used to a certain extent resembles a gigantic version of a Quintus autoclave, because a cover of traditional type is impossible with the chosen inner diameter of the pressure vessel, i.e. 13.4 m. Because of this large diameter, the steam generating modules can be lifted in and out for installation, repair, etc. below the concrete arch positioned thereabove.

SUMMARY OF THE INVENTION

When it comes to designing a smaller unit, for example for a future market in a developing country, with a single module, the Quintus vessel model is no longer suitable. The concrete vessel diameter will be so small that it will not be possible to lift in or out a module with a reasonable height of the concrete cover. Another embodiment of the cover must be chosen. At the same time, the small vessel diameter makes it difficult to use a wet motor pump placed adjacent to the reactor core and the steam generator.

To be able to design a smaller unit, a solution as shown in the accompanying FIGS. 1-8 was instead chosen. A reactor is there placed at the centre of a concrete vessel. The vessel is no longer of the Quintus type but rather resembles a bottle. The "cork" in the bottle is a steel dome which is secured to vertical bracing cables. Instead of using a wet motor pump, a "conventional" pump with a shaft packing and a dry motor is utilized, which is mounted at the centre of the steel dome. The water flows straight up from the core through a riser to this pump. The pump presses down the process water through the tube bundle of the steam generator to the inlet chamber of the core, where the cycle starts again.

The thermal power of the steam generator has now increased from 670 to 1000 MWth. The steam generator is suspended from brackets mounted in the wall of the concrete vessel, as shown in the figures. If the steam conduits extend through a wall, the use of a bellows-type arangement is necessary. The steam for pressurization is located at the top in the steel dome at the side of the pump installation.

For refuelling the circulation pump is removed. This makes the core accessible through the riser. The refuelling is carried out with an advanced manipulator which is inserted through the riser and operates above the core. The fuel is taken out through the riser and is placed by means of another manipulator into cassettes located inside the concrete vessel outside the steam generator.

If necessary, the steam conduits may be dismantled and the whole steam generating module be lifted out of the concrete vessel.

One difficulty with the above-described variant is that a steam collecting tank, from the underside of which - i.e. the tube plate - there extend steam generator tubes, is subjected to an external overpressure. Designed in accordance with the ASME standards, it will therefore be very thick-walled and the thermal transients, which occur e.g. when the circulation pump stops, may lead to difficult problems. To avoid such problems, other locations of the steam generator have been studied.

DESCRIPTION OF THE PREFERRED EMBODIMENT

Figure 1:
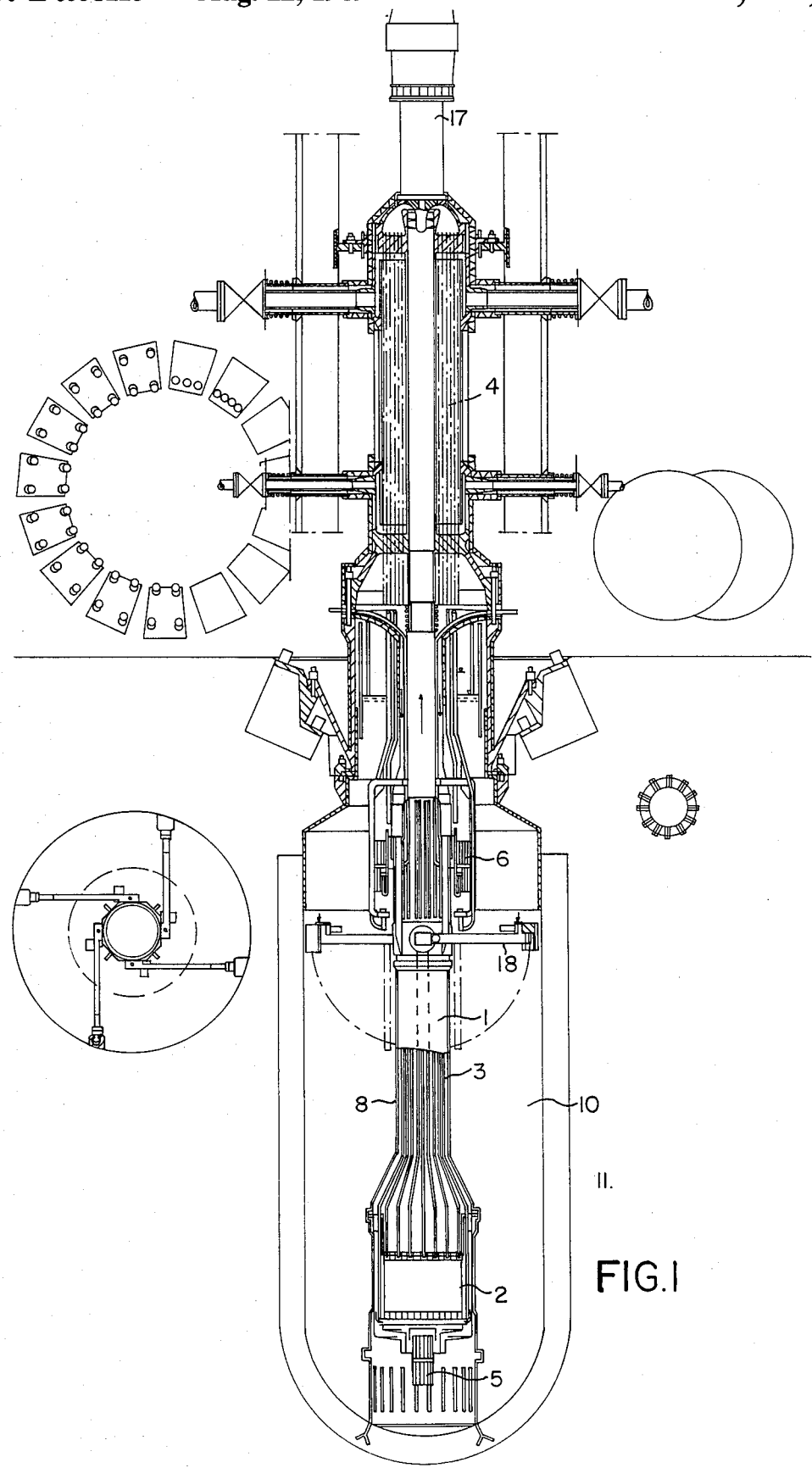
FIG. 1 shows a single-module reactor with the heat exchanger/steam generator above and outside the reactor pool.
Figure 2:
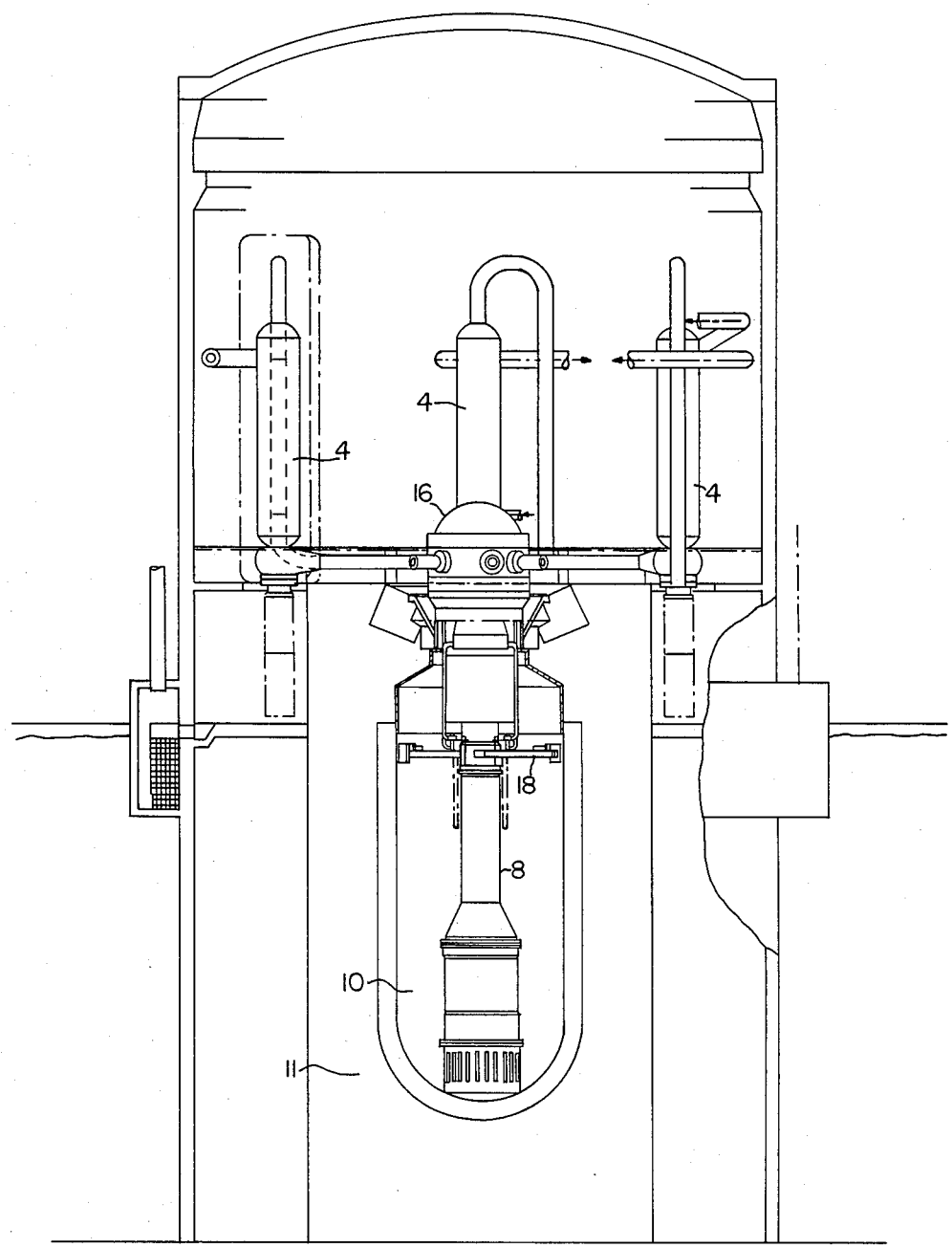
FIGS. 2-5 show in section and from above alternative solutions for a reactor arrangement.
Figure 3:
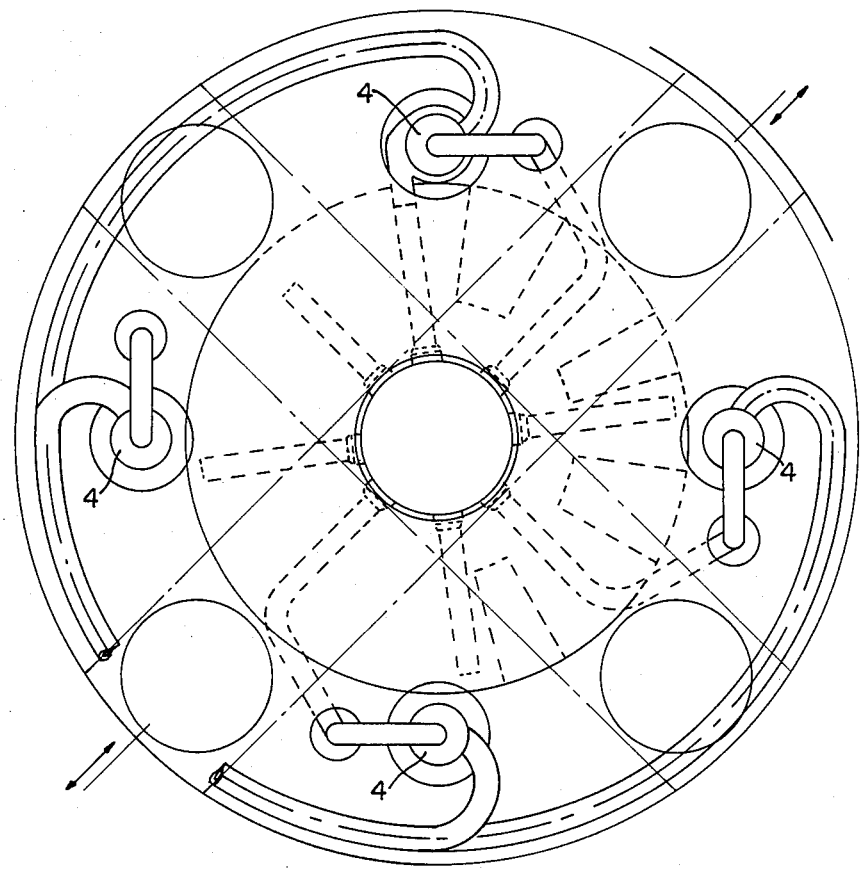
Figure 4:
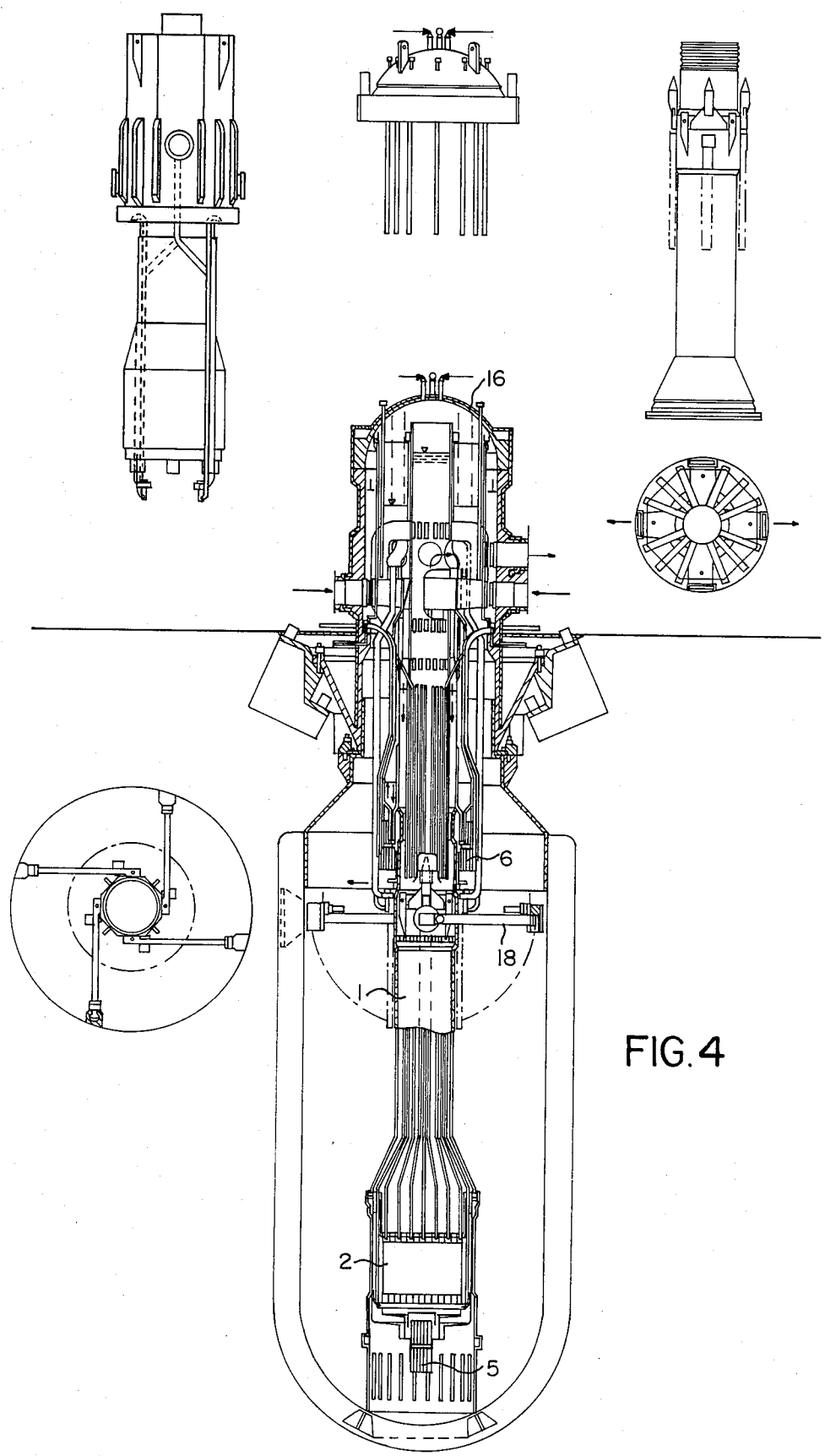
Figure 5:
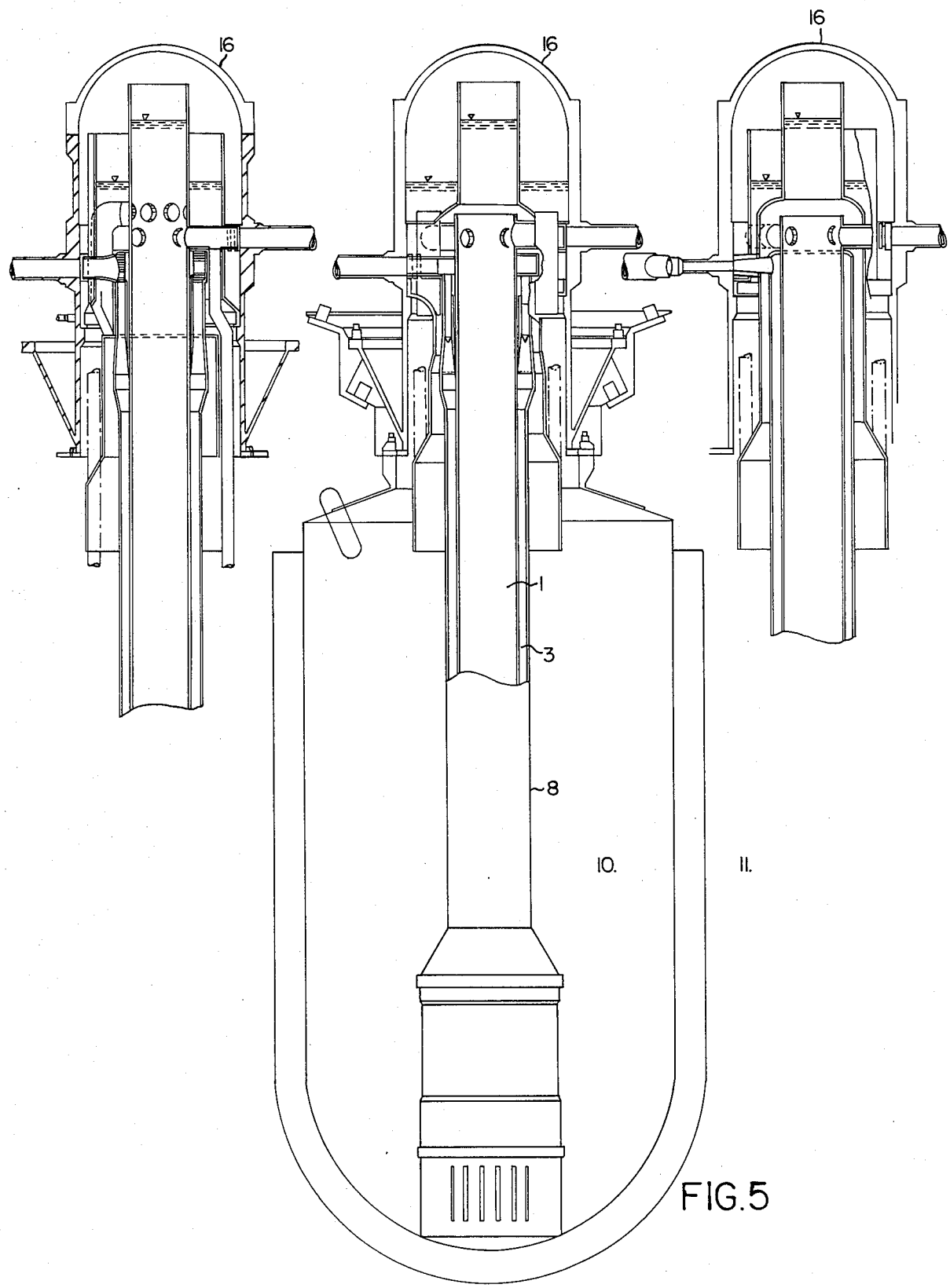
Figure 6:
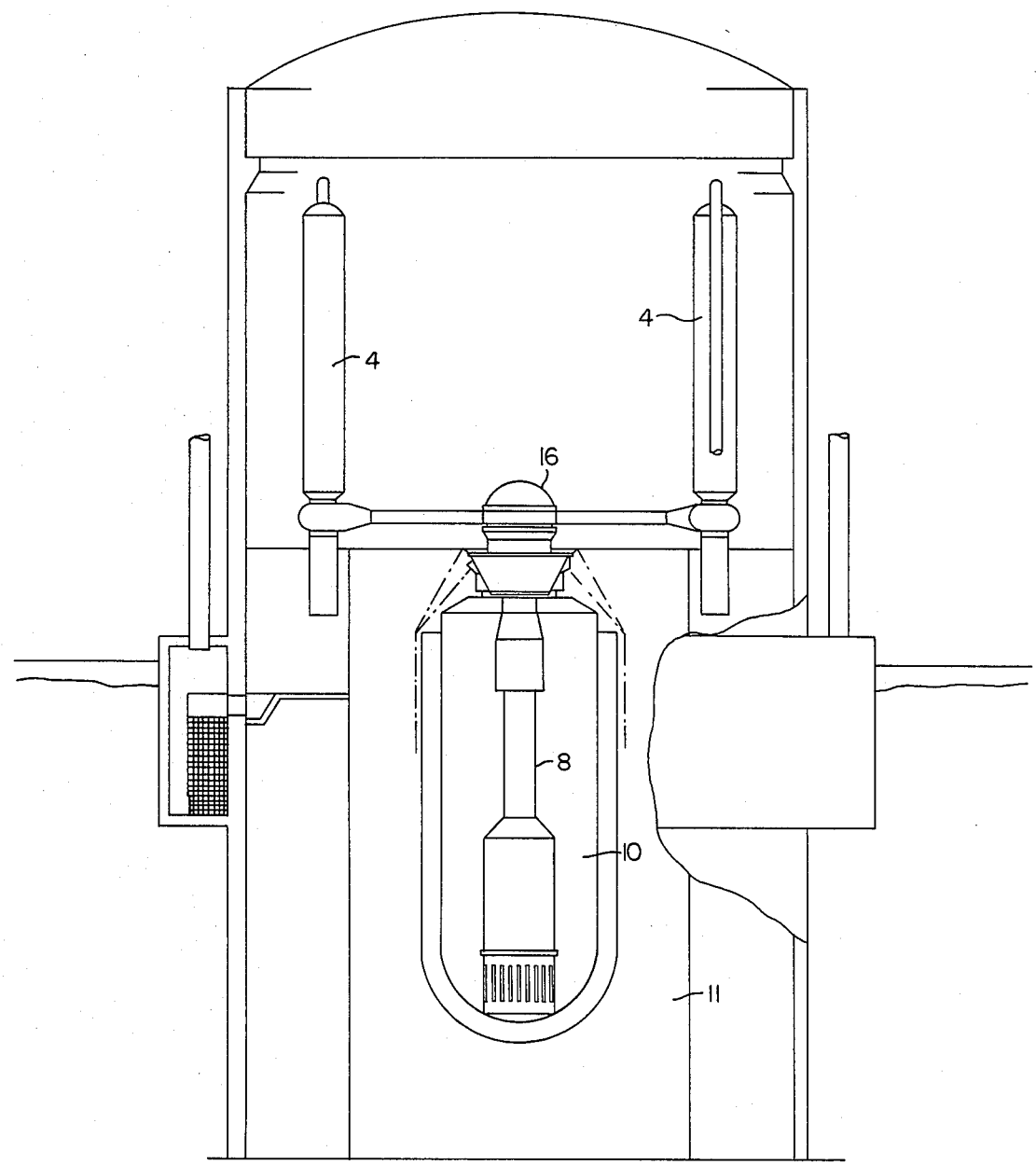
FIGS. 6 and 7 show schematic alternative solutions for a heat exchanger/steam generator arrangement.
Figure 7:
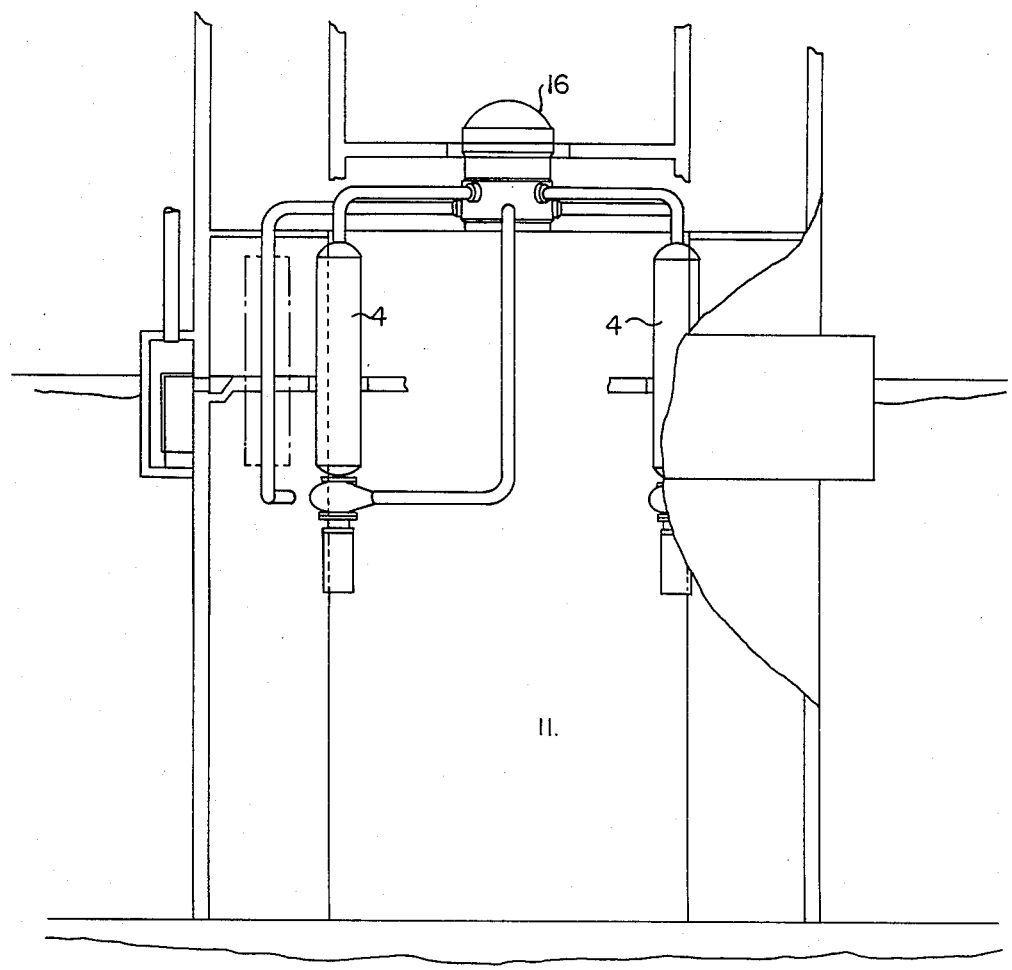
Figure 8:
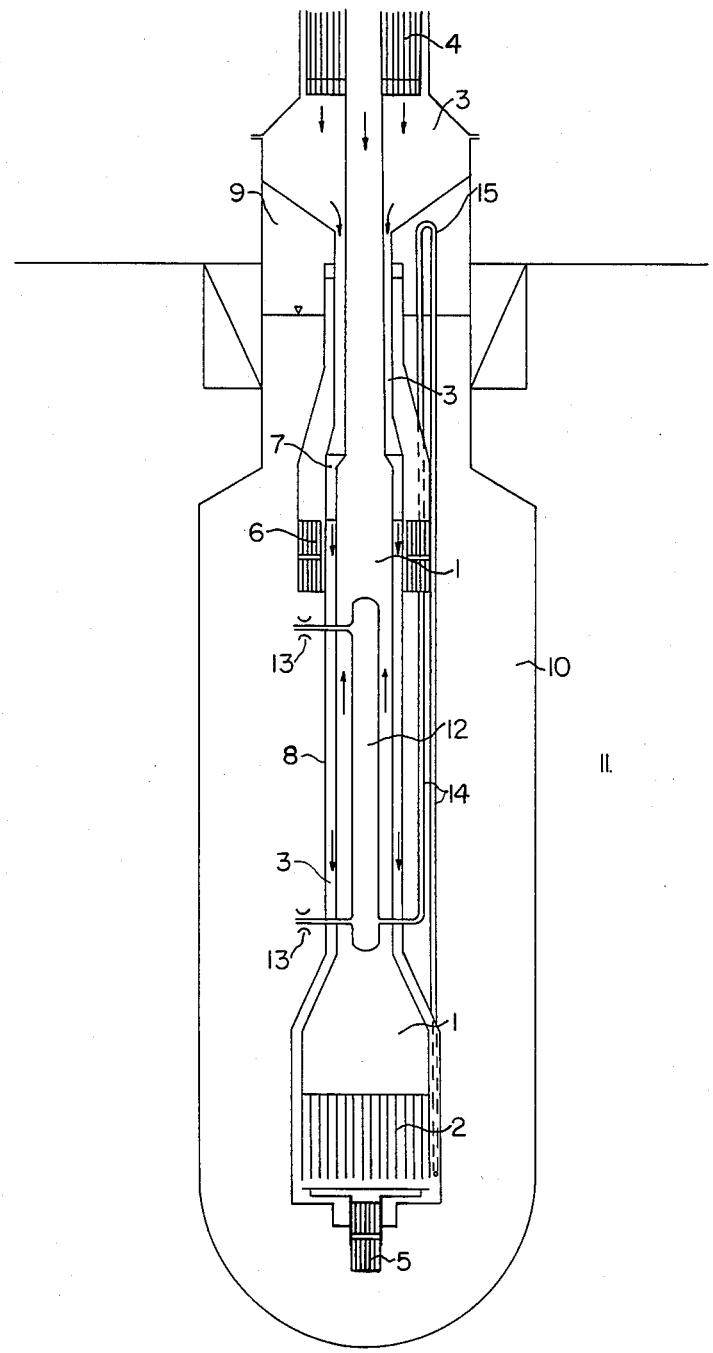
FIG. 8 shows how the boron accumulator is arranged inside the riser.

To avoid the problem with external overpressure on the steam collecting tank, this tank has been moved out of the concrete vessel 10, 11 and constitutes the upper part of the steel dome 16 in the "bottleneck" of the concrete vessel, as shown in FIGS. 1, 5, 6. The steam generator tube bundle 4 to a large extent fills up the "bottleneck" and extends a certain distance below this. A disadvantage of this is that this leaves a fairly small volume for pressurization steam. The upper density lock 6 must be moved down below the steam generator tube bundle, whereas in the previous design it was located above the steam generator. A consequence of this is that the hot water with a low boron content in the upper part of the riser 1 and in the tube bundle 4 of the steam generator remains there are a stoppage of the circulation pump. Start-up of the pump after cooling of this water and after disintegration of Xenon 135 could result in a reactivity accident. One way of preventing this is to send the water, coming from the steam generator tube bundle 4, as a driving flow in jet pumps which suck water from those areas lying below the density lock where the water is highly borated, as shown in the figures.

Refuelling can either be carried out with a manipulator, as in the above-mentioned alternative, or after removal of the entire steam generator. In the first-mentioned case, however, the spent fuel cannot be placed inside the concrete vessel since the volume outside the steam generator is not accessible.

Steam generation inside tubes which are under an external overpressure from the primary coolant implies an unconventional design involving relatively considerable development expenditure. By disposing the entire steam generator above the concrete vessel, a more conventional embodiment for nuclear steam generators can be chosen, i.e. with the primary coolant inside the tubes and steam generation on the outside thereof.

When arranging the steam generation equipment (essentially steam generator +pump) inside the concrete vessel together with the core and the natural circulation system, which guarantees the safety via the borated water pool, it is suitable for several reasons to use the module principle. If this equipment is located outside the concrete vessel, the importance of the modular concept is to a certain extent lost. If greater power is desired than what one steam generator and one pump, respectively, are able to provide for technical reasons, several steam generators msut be used but there is no corresponding incentive to divide the core into several parts.

The previously described arrangement with a centrally placed steam generator means that, in practice, the steam generator has to be removed for refuelling, and this cannot be used, of course, if several units have to be used for capacity reasons. In that case, the steam generator is connected to the central steel dome 16 above the "bottleneck" of the concrete vessel by means of conduits. As in all previous cases, the steam generator is designed as a one-passage apparatus, i.e. feed water is supplied at its lower end and dry steam is taken out at its upper end. The primary water flows downwards while being cooled. When the steam generator is positioned at the side, one tube with primary water leads to the upper end of the steam generator and one tube leads to the lower end thereof. Circulation pumps are advantageously placed below the steam generator so that they pump cooled water. The pump is advantageously designed with a wet motor and is then of the type previously used for boiling reactors. The arrangement for controlling the water flow inside the steel dome is clear from FIG. 5. The riser 1 extends from the core 2 up past the level where the flow to the steam generator is taken out. The steam generator is disposed with its upper end below this outlet point. Normally, four steam generators are used, each one being disposed with suitable radiation shielding in one of the bracing ducts for the horizontal bracing cables of the concrete vessel.

When the flow is taken out from the vertical riser 1 to the (normally four) tubes to the steam generators, it is accelerated up to a reatively high velocity whereby the static pressure drops so that, in operation, it is considerably lower than that of the surroundings. This provides a possibility of admitting, via a so-called scram valve, cold highly borated water from the pool into the primary system, thus achieving a rapid increase of the boron content of the water and a reduction of the power.

According to the fundamental principle of the SECURE reactors, an open natural circulation system is to be provided through the core 2, the riser 1, the upper density lock 6, the boron water pool 10, and the lower density lock 5 and back to the core 2. Thus, during normal operation the flow through the density locks is prevented by controlling the speed of the main circulation pump 17. From the riser 1 this flow path extends through the ports 7, shown above the conduits to the steam generators, down to an annular gap, the lower end of which consists of the density lock. If the circulation pump stops, the water which by natural circulation cools the core will thus pass through these tubes. The water from the core, which in this situation is relatively cold, can then run into the steam generator and replace the initially hot water by cold borated water, provided that this emptying does not take place by reverse direction flow. In this way it is ensured that the steam generator will not contain low-borated water which, after start-up of the pump, might causes an inadvertent criticality when arriving at the core.

The riser 1 opens out at the top into a steam volume 9, the pressure of which pressurizes the entire volume inside the concrete vessel. Electric heaters are immersed into the uppermost part of the pool water, which is thus in contact with the steam volume. The upper end of the riser should be formed such that subcooled water flowing from the main circulation system does not reach the surface causing condensation of pressurization steam there, for example, by being filled with a bundle of tubes of a smaller diameter which kill the turbulence. The hydrostatic pressure balance, counting from the lower end of the upper density lock 6, causes the level at the upper edge of the riser 1 to be higher than the surrounding pool water 10. The main circulation pipes, coming from the steam generators, may be connected at a somewhat lower level than the outgoing pipes to enable replacement of the water content of the steam generator after stoppage of the circulation pump through reverse direction flow. The incoming pipes from the steam generators are connected to a horizontal annular chamber. From the lower side thereof there extend a number of vertical tubes with a smaller diameter. These tubes open up into a so-called siphon breaker, which is simply an interruption in the tubes. After having passed over this "gap", the flow again passes into vertical tubes which are then enlarged into a diffusor, the static pressure thus increasing.

The static pressure after the diffusor shall be of such a magnitude that it is just sufficient to press the intended flow down into the inlet plenum of the core. A second pressure condition is that the static pressure inside the pipe at the opening shall be the same as in the surrounding water otherwise, there will be an inward or outward net flow which will cause a mixing of water of two different temperatures, which is harmful from the point of view of exergy. The tube diameter at the siphon breaker must be adapted such that both the above pressure conditions apply. The final adaptation may have to be made in connection with the hot testing operation of the plant.

The siphon breaker has a threefold task:

To serve as a siphon breaker in the case of a rupture at a low level in a main circulation pipe, for example at the lower end of a steam generator. Otherwise, a considerable part of the water volume of the reactor pool may be lost through siphon effect.

To serve as a flow path when replacing the water content of the steam generator in case of a pump stoppage.

To serve as an outlet for steam, generated in the external circuit, in the case of pressure loss transients.

The siphon breakers are normally located so as to be situated in the upper part of the riser, although - to avoid turbulence problems - they are shielded in relation to the main flow of the riser. However, they may be alternatively located in the gap down to the upper density lock. The diffuser tubes located below siphon breakers open out into an annular chamber, arranged above the riser, which forms the upper end of the annular downcomer which extends all the way down to the inlet plenum of the core. The plant components described above are all welded together to form a steel structure which, in connection with refuelling, is removed as one unit (referred to here as the upper flow guide structure, UFGS) after the lid of the pressurization volume has been removed.

In operation, a surrounding downwardly-directed flange on the UFGS seals by means of metallic rings against a plane upwardly-directed shelf on the inner periphery of the surrounding steel vessel. This seal separates high-borated pool water in the middle from low-borated process water nearest the wall. The flange is connected to a vertical sheet-metal shield which is welded to the main circulation pipes extending through the shield. A shield is positioned immediately inside the outer pressure-supporting wall, except at the above-mentioned tube passages, where it is withdrawn and leaves room for a sealing device which is accessible from above and consists of a bellows which, in operation, presses a tubular sleeve against a plane opening at the orifice of the outgoing tubes, thus obtaining sealing.

The upper flow part is pressed by means of elastic girders, loaded from the vessel cover, against the above-mentioned surrounding seal. When removing the UFGS prior to re-fuelling, the tubular seals (which are preferably eight in number) are pressed back with the aid of a tool operable from above, so that the UFGS can be lifted out in its entirety. In the same plane (at the same "shelf") as the large surrounding seal there may be a number of smaller tubular seals which, when the UFGS is pressed down, provide sealing between conduits extending from below, which conduits at a lower level pass through the pressure-supporting wall, and tubes in the UFGS, which proceed downward in this flow guide structure. These tubes accomodate, among other things, the flow from the reactivity control system as well as pressurization water to the scram valves. By using the above-mentioned arrangement, these tubes need not be dismantled separately in connection with refuelling.

The guide tubes for the core instrumentation and certain other instrumentation (primarily thermocouples and neutron flux monitors) also pass through the UFGS. The guide tubes consist of slender tubes (15–25 mm diameter), fixed in a suitable manner to surrounding walls. On its way to, for example, the core, an instrument probe passes through several such guide tubes located one after the other. They are formed so as to have a small vertical gap between them, but the upper end of the tube located on the underside of the gap is formed as a funnel for the instrument probe. For refuelling and removal of the UFGS, the instrument probes are withdrawn so that they are positioned in holes in the pressure-supporting wall opposite to the (horizontal) end of the uppermost instrument guide tube. The neutron detectors are thereby surrounded by lead shields. The thermocouples are suitably replaced upon each refuelling.

The flow from the outer reactivity control system consists of water with a controlled boron content. To achieve an increase in power, boron-free water is supplied, and to achieve a decrease in power, water of a high boron content is supplied. In continuous operation, the incoming mixture has largely the same boron content as the outgoing one. When supplying boron-free water, it is important that a main circulation flow is maintained in which the incoming water can be mixed in a controlled manner. Feeding pure water into the primary circuit in the case of nonoperating pumps could lead to uncontrolled local accumulations of low-borated water with an ensuing risk of cricicality incidents upon start-up of one or more pumps. However, it must be assumed that pumping of boron water into the primary circuit in the case of non-operating pumps may take place by mistake. The pumping in of the water is therefore carried out in such a way that the pure water flows out into the pool instead of into the primary system in this case. The pumping in of water from outside takes place through one or more tubes into a pocket located adjacent to the upper density lock. It can be assumed that the incoming pure water is colder than the water in the primary system where the latter is heated, inter alia, by the decay water of the core. If the pump is not operating, this cold water will simply flow over the edge into the above-mentioned pocket and disappear out into the pool through the upper density lock. If the pumps are operating, however, the water is sucked in through a tube, parallel to a tube from the scram valve, to the exhaust tube of the respective steam generator and is then mixed into the primary system.

At its bottom, the UFGS is in contact with and seals against the twin tube which, in the centre tube, transports water upwards from the core and which, in the annular gap, transports water, coming from the steam generators, to the core. This plant component is here referred to as the lower flow guide structure (LGFS). The seal is achieved by compressing two concentric bellows. The outer one of the two concentric tubes in the LFGS is conically enlarged at its lower part and is bolted at its lower part, via a flange, to that cylindrical structure, fixed to the bottom of the concrete vessel, in which the reactor core is mounted, this structure being here referred to as the core vessel.

The inner tube in the lower flow part seals by means of an elastic sealing ring against a cylinder which is concentric with the core vessel and is referred to as the core barrel. The core barrel is mounted in a plane near the above-mentioned flange of the core vessel and at its lower part is connected to a grid, which supports the fuel assemblies of the core. The lower edge of the core barrel is provided with projections which, in the same way as teeth, extend into outlets in the lower edge of the core vessel, thus preventing horizontal movements of the core barrel caused by earthquake forces.

Thus, the incoming main circulation flow extends from the LFGS through the gap between the core vessel and the core barrel and in under the grid supporting the core and from there into the fuel assemblies of the core. In addition, each fuel assembly has a separate inlet for water from the pool which arrives at the core in the event of certain transients, for example stoppage of a circulation pump. This water arrives from the lower density lock and is collected in a lower plenum, from where the above-mentioned separate inlet to each fuel assembly extends. Like the upper density lock 6, the lower density lock 5 preferably consists of a bundle of open tubes, in which hot water is superimposed on cold water. The tubes are preferably welded at their lower part to a plate, which in its periphery is welded to a cylindrical casing which constitutes the outer casing of the density lock. This outer casing is insulated against the cold pool, positioned outside thereof, by means of so-called wet insulation. On top of this insulation, along the upper part of the density lock, there is possibly arranged a zone with hot water by allowing a tube, opening into the outlet side of the core, to suck water from the bottom of a cylindrical gap, the upper end of which is in contact with the inlet side of the core. This hot gap, in turn, is heat insulated on its outside. Above the actual density lock there is arranged a buffer zone of approximately the same volume. In case of transients, for example a brief short-circuit on the electric grid, the "boundary" between hot process water and cold pool water is temporarily displaced upwards into this buffer zone, whereby an undesired reactivity disturbance is avoided. The buffer volume is maintained hot in the same way as the above-mentioned gap by a tube - opening out at the lower end of the buffer zone - transporting water directly to the outlet plenum of the core.

The primary circuit of the reactor consists of the following main components: a reactor core in a reactor vessel; a riser; a circulation system; and a steam generator.

The reactor core 2 is here a typical PLUS core, which means that it has fuel rods of approximately the same thickness as the fuel rods in boiling water reactors but only half the length thereof. The core 2 is supplied with water from an inlet chamber and leaves its water to the riser 1 of the primary circuit. The reactor core 2 is surrounded by a core vessel 8. The core vessel 8 has thin walls, and between it and the core barrel the lowermost part of the downcomer 3 of the primary circuit is located. This downcomer 3 terminates in the inlet chamber of the reactor core 2.

The riser 1 of the primary circuit is an approximately 18 m high vertical tube with a diameter of 1.5 m. This tube is placed above the reactor core 2, and the hot water from the core 2 rises upwards through the riser 1 since it is lighter than the cold water which surrounds the riser. This is the effect which is often called the "chimney effect". At a height of 18 m above the core top, the riser changes into a somewhat more slender but similarly vertical tube, which is the inlet tube of the circulation system. At the top the upper density lock 6. The riser has double walls in the same way as the reactor vessel and the inlet tubes of the circulation pump. The annular gap between the two tubes is also referred to as the downcomer 3 of the circulation system. At the top, the outer walls of the riser are connected by means of seismic supports 18 to the walls of the concrete vessel. In connection with refuelling, the supports are detached from the walls and accompany the riser out of the concrete vessel.

In the direction of flow, the circulation system consists of the following components: the riser 1 of the primary unit; the central inlet tube of the steam generator; the re-circulation pump 17; the outlet chamber of the circulation pump; the steam generator tubes 4; the outlet chamber of the steam generator; the downcomer of the intermediate unit; the downcomer 3 outside the riser; and the downcomer in the core vessel.

The riser 1 of the primary unit consists of a vertical tube with a diameter of about 1 m, which at its bottom part constitutes an upward extension of the riser and at its top part seals against the central inlet part of the steam generator.

The central inlet tube of the steam generator 4 is a vertical tube with a length of about 12 m and with an inner diameter of about 1 m which interconnects the two tube plates of the steam generator.

The re-circulation pump 17 takes water from the above-mentioned tube and presses is out into the outlet chamber. The pump is a centrifugal pump of the same type as is used in conventional pressurized water reactors.

The outlet chamber of the circulation pump is a hemispheric space, the lower limit of which consists of the upper tube plate of the steam generator.

The steam generator tubes (about 15,000 with a free tube length of about 12 m) are attached to the upper and lower tube plates.

After flowing through the cooling in the tubes, the water flows out into the outlet chamber of the steam generator. This chamber has a height of about 2 m and contains a package of tubes, which at least at their lower end are welded to a plate, through which tubes the water flows but on the outside of which there is stationary water of the same pressure. The task of this battery of tubes (or, alternatively, stainless steel in other configurations) is to lower the speed of the temperature reduction in the lower tube plate of the steam generator when the circulation system enters into operation. This can be done by successively heating the cold water, coming from below, when it passes through these tubes before reaching the lower tube plate. The water then flows in a direction opposite to that during normal operation.

The downcomer of the intermediate unit collects the flow from the outlet chamber of the steam generator and transports it downwards to the downcomer 3 connected to the riser 1. The upper part of the downcomer has the shape of a funnel, the upper edge of which is welded to a ring with seals on its upper and lower sides, which ring is bolted between the flanges of the steam generator and the pressurization space. This ring is provided with welded lead-throughs for core instrumentation (thermocouples and neutron detectors) for operation water to the cut-off valve for water from the reactivity control system with a controlled boron content, etc. The funnel terminates in a vertical tube, surrounding the riser of the intermediate unit, which seals by means of bellows-type seals against the downcomer outside the riser.

The steam generator of the primary circuit surrounds the previously mentioned inlet tube. It consists of a number of vertical steam generator tubes, which are attached to, for example, two conventional tube plates, one in the upper end of the steam generator and one in the lower end thereof. The circulation pump imparts such a pressure to the water of the primary circuit that it passes through the tubes of the steam generator and continues from their lower end down through the previously mentioned downcomer. On the outside of the steam generator tubes there is water which is brought to boil, and in this way the heating effect of the reactor is transmitted to a non-radioactive outer system. The steam can, for example, be used to drive a turbine. In operation, the steam generator is bolted to the flange on the upper edge of the pressurization space. The steam generator can be mounted inside a concrete containment, which is fixed to the concrete vessel by means of extensions of vertical bracing cables, thus sealing against the concrete vessel.

The reactor pool 10 is a pool of water which surrounds the primary system. It has a volume of about 1700 $m^3$ and fills up the inner volume of the concrete vessel 11 and approximately half the pressurization space. The water in the reactor pool is a solution of boric acid and has a boron content of about 0.2%. To shut off the reactor, normally only a fraction of this concentration is needed. The two density locks 5, 6 constitute open connections between the primary circuit of the reactor and the reactor pool. Both density locks consist of a bundle of vertical tubes, the upper ends of which are located in the hot primary system water and the lower ends of which are located in the cold pool water. In the tube bundles a temperature gradient is formed. In the lower density lock, the area of which is about 0.5 $m^3$ and the tube height of which if about 1 m, the boundary between hot low-borated water and cold high-borated water is maintained at a constant level by means of speed control of the circulation pump. In the upper density lock 6, the level of the boundary is maintained constant by volume control of the water content of the primary circuit.

If the re-circulation pump 17 is shut off, or if the re-circulation system is otherwise disturbed, the positions of the boundaries in the density locks will be displaced. The hot water of the riser, for example in the event of a pump stop, will flow out, in natural circulation, into the reactor pool through the upper density lock, and the lost water is replaced by pool water which flows into the primary circuit through the lower density lock. The power of the reactor will be transferred to the reactor pool instead of to steam on the secondary side of the steam generator. However, this power will rapidly drop. When the highly borated pool water arrives at the reactor core, the reactor is rapidly shut down and its power drops to a residual power of a few per cent.

The reactor can thus be shut down very rapidly by stopping its re-circulation pump. A milder way of carrying out the same shut-down is to open a hydraulic valve which connects the reactor pool to a location in the riser which has under-pressure in relation to the pool. When such a valve is opened, the reactor is shut down in about 80 seconds and the temperature conditions are changed more slowly in thick-walled steel parts in the primary circuit than in the case of a pump stop.

In the case of, for example, a stoppage of the re-circulation pump, hot water with a low boron content will remain in the steam generator and in its branch pipes and outlet pipes. The above-mentioned circuit replaces this water by pool water. The shut-down circuit takes water in the reactor pool and leaves it in the same after passage of the primary side of the steam generator and of a heat exchanger. During normal operation, a flow which is parallel to the inlet flow passes via the shut-down circuit, but this does no harm since the heat exchanger of the circuit then has not water on its secondary side. If the reactor is shut off because the re-circulation pump stops, the water circulates (in the reverse direction) via the shutdown circuit because the secondary side of the heat exchanger has been filled up. This is prevented during normal operation by the pressure of a fan, mounted on the pump motor shaft, preventing water from a pool located at a high level from flowing out via the heat exchanger.

If the pump stops, the pressure caused by the fan ceases and the water from the pool runs through the heat exchanger and cools its contents of water on the primary side. The cooled water flows down to the volume above the upper density lock and from there out into the pool. It is replaced by water of a high boron content coming from the pool. This causes the primary side of the steam generator to become filled with borated pool water and means that a start-up of the re-circulation pump does not involve any risk of the reactor suddenly becoming critical.

The pressure vessel system of the reactor consists of the concrete vessel and the steel vessel with the pressurizer.

Up to a height of 20 m above the top of the reactor core, the primary circuit is enclosed within a vessel of pre-stressed concrete. This vessel has for a reactor with 1000 MW power an inner diameter of 9.5 m. The upper four metres have the somewhat smaller diameter of 7 m. The vertical bracing cables of the concrete vessel surround the vessel half-way, and both their ends are secured by tie bars to the upper end surface of the vessel. Some of these tie bars have the additional object of keeping the casing, surrounding the steel vessel of the reactor, in position. The horizontal bracing cables of the concrete vessel are full-turn cables and are braced against projections on the envelope surface of the vessel. The design pressure of the concrete vessel is 10.5 MPa. The concrete vessel is internally coated with a stainless steel liner. It is in its entirely filled with the water of the reactor pool. Inside the concrete there is a cast-in steel diaphragm as an additional leakage barrier.

The steel vessel of the reactor is an extension in the upward direction of the concrete vessel. It is divided into the following spaces: the pressurization space and the outlet chamber of the steam generator; the steam generator space; and the outlet chamber of the circulation pump. These spaces are separated from each other by the two tube plates of the steam generator.

The pressurization space is surrounded by a vertical steel cylinder, which is designed for an internal overpressure of 10.5 MPa. It has an inner diameter of 5.2 m and a height of 8 m. The lower half of the space is filled with water from the reactor pool, which is maintained at saturation temperature with the aid of electric heating elements. The upper half of the pressurization space is filled with steam.

The steam generator space (the seondary side) is surrounded by another vertical steel cylinder which is designed for an internal overpressure of 5.0 MPa. Its diameter is 3.2 m and its height 12 m.

The outlet chamber of the circulation pump is provided with a hemisperic cover. It is designed for an internal overpressure of 10.5 MPa. The steam volume of the pressurizer consists of the upper half of the volume in the lower cylinder of the steel vessel. The pressurizer is filled with steam, which in operation is maintained at a pressure of 9.0 MPa. The steam is generated by electric immersion heaters immersed into the water.

Those conditions in the primary circuit which above all must be kept under supervision by means of instruments are neutron flux distribution and temperatures. Tubes to the sensors of these instruments primary extend up through the riser to a point just below the lower tube plate of the steam generator. At that point they deviate in a horizontal direction and extend out through the flange ring of the intermediate unit.

In the case of loss of pressure in the pressurizer (e.g. because of a leakage), generation of steam takes place in the water in the hot primary circuit, and the circulation pump will be positioned in a steam bubble and will be substantially ineffective. The water in the steam generator tubes and in the downcomer below it will boil and will find its way out to a lower pressure, among other things by flowing downwards towards the lower density lock. This may cause the water, flowing through the lower density lock to the core, to become displaced and the reactor to become critical because of the low boron content in the water coming from the downcomer (the boron content being the same as the original one prior to the leakage). If, in addition, the temperature of the water has been reduced by the emission of steam, the temperature of the reactor fuel may become higher than the original one because of the negative moderator temperature coefficient of the reactivity, whereby damage to the core cannot be excluded.

The task of the system described here is to mix water flowing from the downcomer 3, because of the pressure reduction, into the inlet plenum of the core 2 with water having the high boron content of the pool 10, thus making it impossible for the reactor to become critical. The system comprises an elongated container 12 (referred to as boron accumulator) located inside the riser 1, the top and bottom of this container communicating with via slender pipes 13 with the pool. In operation, a slow natural circulation flow of the pool water will take place through the container. This leads to a certain heat loss, but this is kept low because the flow is small. From the bottom of the container 12 a tube 14 extends up to the uppermost point of the pressurizer, after which point it turns downwards and opens out into a number of locations 16 (or via a distributor ring) in the lower end of the downcomer immediately before the water flows in under the core 2. At that point where the tube reaches its highest point in the pressurizer volume, it communicates via a small opening 15 with the steam in this volume. During normal operation, the water in this tube is stationary. Upon a heavy pressure reduction, steam will form in the upper part of the container. This steam presses out the contents of the container via the mentioned tube so that the borated water of the container is mixed into the water with a low boron content coming from the downcomer, thus preventing criticality of the reactor.

When preparing for refuelling, the concrete containment surrounding the steam generator is loosened from the upper side of the concrete vessel, and the steam generator is unbolted from the pressurization space of the steel vessel. The steam generator with concrete containment is lifted somewhat and is then transported to the side by means of a hydraulic and pneumatic sliding device. The core instrumentation is then pulled up from its operating position so that the sensors are located in the lower end of those instrument guide tubes which terminate at the lower edge of the intermediate unit. The intermediate unit in its entirety, including the flange ring, is then lifted out of the concrete vessel and is placed in a well at the side thereof after tubes, connected to the unit, have been disconnected. Thereafter, the riser is removed after loosening its bolted joint to the reactor vessel and its seismic supports. What remains above the core is then a control grid for the fuel assemblies with certain instrument guide tubes. This control grid is then moved to the side. The core is thereafter freely available for refuelling. Spent fuel is then located at the side in an available space in the pool. When restoring for operation, these procedures take place in the reverse order.

Service of the riser and the parts of the circulation system is preferably carried out when the respective components have been removed from the concrete vessel.

I claim:

1. In a reactor with a reactor core enclosed in a water-filled core vessel, the core vessel being connected to an inlet and an outlet for cooling water, comprising:
    at least one hydraulic connection between the outlet and at least one heat exchanger,
    at least one hydraulic connection between the inlet and at least one heat exchanger,
    a re-circulation pump for transporting the cooling water through said reactor core and said heat exchanger,
    lower and upper density locks for said core vessel,
    said core vessel and said reactor core being enclosed in a containment space which is filled and pressurized with a neutron absorbing aqueous solution,
    the improvement wherein
    the containment space is bottle-shaped and has a tapering upper opening, a steel dome arranged above the upper opening being sealed and detachably connected to the surroundings of the containment space, said steel dome substantially at the centre thereof supporting said recirculation pump, the water flowing straight up from the core through a riser to the pump and the pump then pressing down the process water to the core and by means of the detachably connected steel dome access is provided to the riser for refuelling through the riser to the reactor core.

2. Reactor according to claim 1, characterized in that the heat exchanger is arranged inside the bottle-shaped containment space.

3. Reactor according to claim 2, characterized in that the heat exchanger in the form of a steam generator is suspended from brackets mounted in the wall of the containment space.

4. Reactor according to claim 3, characterized in that a wall surrounds the containment space and the heat exchanger has connected thereto steam pipes which pass through the wall.

5. Reactor according to claim 1, characterized in that a boron accumulator is arranged inside the riser having a connection for a small flow into the containment space.

6. A reactor which comprises
- a concrete pressure vessel which provides a bottle-shaped containment space therein that contains a pool of neutron-absorbing aqueous solution, said containment space defining a bottom portion and an upper mouth,
- a core vessel mounted in said bottle-shaped chamber, said core vessel having an enlarged lower portion located in said bottom portion of said containment space and an elongated upper portion extending towards said mouth of said containment space,
- a first density lock which communicates between the lower portion of said core vessel and said pool,
- a riser located within said core vessel and extending from said lower portion thereof through said upper portion thereof and, together with said core vessel, defining an annular downcomer,
- a reactor core located in said lower portion of said core vessel and within said riser,
- a heat exchanger which is positioned around said riser, said heat exchanger having an upper end and a lower end,
- a first hydraulic connection located above the upper end of said heat exchanger,
- a second hydraulic connection located below the lower end of said heat exchanger,
- a second density lock which communicates between an upper end of said riser and said pool,
- a steel dome which is sealingly positionable over said mouth of said bottle-shaped chamber, and
- a circulation pump centrally connected to said steel dome so as to pump cooling water upwardly through said riser from said reactor core and then downwardly through said first hydraulic connection, said heat exchanger, said second hydraulic connection, and then through said annular downcomer to said reactor core.

* * * * *